United States Patent Office 2,985,691
Patented May 23, 1961

2,985,691

METHOD OF MAKING VINYLPOTASSIUM

Donald J. Foster, South Charleston, W. Va., assignor to Union Carbide Corporation, a corporation of New York No Drawing. Filed Oct. 6, 1958, Ser. No. 765,302

11 Claims. (Cl. 260—665)

Many problems in organic synthesis would be greatly simplified if there were available a simple and convenient method for introducing a vinyl group ($CH_2=CH-$) directly into a molecule. To so introduce a vinyl group would require an extremely reactive intermediate compound. An ideal intermediate for this purpose would be vinylpotassium, including substituted vinylpotassium compounds.

I have now discovered that a vinylpotassium can be prepared by the direct reaction of a vinyl halide with metallic potassium. I have found that vinylpotassium can be prepared by my method without the formation of any intermediates and in good yield by this direct reaction.

In a preferred embodiment of my invention, a vinyl halide is added to a suspension of finely divided potassium dispersed in a suitable liquid. Preferably, the reaction is carried out in an atmosphere which will not promote side reactions and at a temperature below 0° C.

The vinyl halide may be a vinyl chloride, a vinyl bromide or a vinyl iodide, with vinyl chloride the preferred reagent. The vinyl halide may be an unsubstituted vinyl halide or it may be a substituted vinyl halide, from which a substituted vinylpotassium compound can be made. Many such substituted vinylpotassium compounds can be made, including cyclohexenylpotassium, alpha-styrylpotassium, 2-butenylpotassium, alpha-methyl-beta-styrylpotassium, 2-propenylpotassium, iso-butenylpotassium, 1-propenylpotassium-1, 1-cyclooctenylpotassium, 1-cyclodecenylpotassium, 3-phenylpropen-1-ylpotassium, 1-(1-naphthyl)vinyl-potassium and the like.

The liquid in which the potassium is suspended may be any liquid which does not react with potassium or vinyl halides and which is itself a stable liquid under the reaction conditions. Suitable liquids include both aromatic and aliphatic hydrocarbons.

A preferred class of liquids for use in the invention are the aliphatic ethers containing from two to twelve carbon atoms. Such ethers include methyl ether, methyl ethyl ether, ethyl ether, n-propyl ether, isopropyl ether, n-butyl ether, isobutyl ether, amyl ethers, hexyl ethers and mixed ethers of the foregoing. Also preferred are ethers of ethylene glycol and of diethylene glycol. These include ethylene glycol dimethyl ether, ethylene glycol diethyl ether, ethylene glycol methyl ethyl ether, ethylene glycol ethyl butyl ether, ethylene glycol dibutyl ether, diethylene glycol dimethyl ether, diethylene gylcol diethyl ether, diethylene glycol ethyl butyl ether, diethylene glycol dibutyl ether and diethylene glycol ethyl hexyl ether.

Also suitable are cyclic ethers such as tetrahydrofuran and dioxane as well as aromatic ethers such as ethylene glycol diphenyl ether and diethylene glycol diphenyl ether.

The reaction temperature is not narrowly critical and may vary from −90° C. to as high as 20° C. When using the preferred ether liquids in which to carry out the preparation of vinylpotassium the temperature should be below 0° C. and preferably below −10° C. to prevent secondary reactions of the ether. A preferred reaction temperature when using ethers is about −25° C. With hydrocarbon solvents temperatures of 20° C. are desirable to give a reasonable reaction rate. At temperatures below −78° C. the reaction rate is ordinarily too slow in any solvent.

The vinyl halide may be added to the dispersion of potassium in a liquid, either as a solution of vinyl halide in the same liquid or a compatible liquid, as a liquid, or by bubbling vinyl halide gas through the dispersion. When the vinyl halide is added as a solution atmospheric pressure is ordinarily suitable, or slightly superatmospheric pressure if the reagent or liquid is low-boiling. It is desirable, moreover, that the reaction be conducted in an atmosphere that will not cause side reactions, as would air. Such an atmosphere may be achieved in any of several ways. When the vinyl halide is added in solution a convenient way of providing an atmosphere which will not enter side reactions is to conduct the reaction under an inert gas, such as argon or dry nitrogen. The pressure may ordinarily be atmospheric but may be somewhat above in order to maintain the reaction media liquid and the reactants in the liquid state, if any are low-boiling.

The gaseous vinyl halides may also be introduced into the reaction mixture by bubbling gaseous vinyl halide through the liquid suspension of finely divided metallic potassium. The required atmosphere which will not enter into side reactions can be provided by maintaining an atmosphere of the gaseous vinyl halide above the reaction mixture at the appropriate pressure. An atmosphere of inert gas can also be employed.

The preferred form for the metallic potassium is subdivision into particles of about 50 micron size or below, although much larger particles are operable in the invention. The smaller particle size increases the rate of reaction, however, probably because the vinyl halide reacts on the surface of the metallic potassium and the small particle size presents greater surface area. The necessity for extremely fine subdivision of the potassium decreases when vigorous agitation of the reaction mixture is provided. This is because such agitation aids in the removal of vinylpotassium and potassium chloride from the surface of the metal and thereby exposes fresh metallic surfaces. In another embodiment metallic sodium can be added to the potassium to make an alloy with a melting point temperature below room temperature. An alloy of sodium and potassium that contains between 40 and 90 weight percent potassium is liquid at room temperature and in the process of the invention the potassium in such an alloy will react to form a vinylpotassium, while the sodium will not react. The optimum alloy for use in the process of the invention is one consisting of 80 percent potassium and 20 percent sodium by weight. When this alloy is used in the process of the invention the potassium will remain liquid below 0° C. and a large surface area of the metal is exposed, permitting the reaction to proceed rapidly. The alloy is mixed with an inert solvent in a similar manner to the finely divided metallic potassium, with the same liquids and operating conditions being suitable.

The vinyl halide is preferably added in a stoichiometric amount or slightly less than the stoichiometric amount necessary to react with all the potassium present, so as to assure reaction of all the vinyl halide. From 0.4 to 0.5 mol of vinyl halide per gram atom of potassium is ordinarily employed. The rate of addition of vinyl halide can be varied from immediate mixing of the entire amount to a very slow addition. Rapid addition requires the removal of the considerable heat of reaction, but is generally preferred because with slower addition the probability of undesirable side reactions is greatly increased, decreasing the yield of vinylpotassium.

When using the preferred liquids, the aliphatic ethers, a preferred method of operation is to first add a small quantity of vinyl halide to a suspension of finely divided potassium in an aliphatic ether, in an inert atmosphere such as dry nitrogen and at room temperature. An exothermic reaction ensues almost immediately and the reaction mixture begins to darken noticeably. The reaction mixture is then cooled, preferably to about −25° C., and the remainder of the vinyl halide is added portion-wise, either directly or dissolved in more of the aliphatic ether. Preferably, agitation of the reaction mixture is continued after addition of the vinyl halide is complete, is order to insure completion of the reaction.

Because of its high reactivity, the vinylpotassium product is preferably stored in an inert liquid, which may be the liquid in which it was made, and under an inert atmosphere such as dry nitrogen.

*Example I*

There was prepared a suspension of 47 grams (1.2 gram atoms) of finely divided potassium dispersed in 500 milliliters of butyl ether. A total of 32 grams (0.5 mol) of vinyl chloride was dissolved in 50 milliliters of butyl ether. The potassium suspension was placed in an inert atmosphere of dry nitrogen at atmospheric pressure. A small portion, about 5 milliliters, of the vinyl chloride solution was added to the potassium suspension with stirring at room temperature. There was an immediate exothermic reaction and the reaction mixture began to darken noticeably. The reaction mixture, still under a nitrogen atmosphere, was cooled down to a temperature of minus 25° C. and the remainder of the vinyl chloride solution was added dropwise to the reaction mixture with stirring over a period of thirty minutes. After the addition was complete, the mixture was stirred for an additional thirty minutes to insure completion of the reaction.

The butyl ether slurry of vinylpotassium thus obtained was forced by nitrogen pressure into a slurry of solid carbon dioxide in ether to yield potassium acrylate. About 150 milliliters of water were then added to react with the excess potassium and dissolve the potassium salts. The aqueous solution of potassium acrylate was decanted from the butyl ether and an aliquot was titrated to show a 73 percent yield of potassium acrylate based on vinyl chloride. The aqueous solution of potassium acrylate was then acidified with hydrochloric acid to liberate acrylic acid. This acrylic acid was extracted with ethyl ether and purified by distillation at a reduced pressure of 40 millimeters of mercury. The physical and spectroscopic properties of the acrylic acid thus obtained were compared with those of a known sample of acrylic acid and found to be identical. As a further identification, thionyl chloride and aniline were added to a portion of the acrylic acid product to form acrylanilide. The physical and spectroscopic properties of the acrylanilide thus prepared were compared with those of a known sample of acrylanilide and found to be identical.

*Example II*

There was prepared a suspension of a liquid alloy containing 47 grams (1.2 gram atoms) of potassium and 9.5 grams (0.41 gram atoms) of sodium, dispersed in 500 milliliters of butyl ether, all under an inert atmosphere of dry nitrogen. A total of 32 grams (0.5 mol) of vinyl chloride was dissolved in 50 milliliters of butyl ether. A small portion, about 5 milliliters, of the vinyl chloride solution was added to the alloy suspension with stirring at room temperature. There was an immediate exothermic reaction and the reaction mixture began to darken noticeably. The reaction mixture, still under an atmosphere of nitrogen, was cooled down to a temperature of minus 25° C. and the remainder of the vinyl chloride solution was added dropwise to the reaction mixture with stirring over a period of thirty minutes. After the addition was complete, the mixture was stirred for an additional thirty minutes to insure completion of the reaction.

In order to verify the production of vinylpotassium and identify it, water was added to the reaction product. This resulted in the evolution of gas which was collected in an evacuated vessel and measured. Upon analysis of the gas in a mass spectrometer, the gas was identified as ethylene and it was found that the vinyl potassium had been converted to ethylene in a 68 percent yield based on vinyl chloride.

What is claimed is:

1. Process for making a vinylpotassium compound selected from the group consisting of vinylpotassium and hydrocarbon-substituted vinylpotassiums wherein the potassium atom is attached directly to a carbon atom in the vinyl group which comprises reacting the corresponding vinyl halide wherein the halogen atom is attached directly to a carbon atom in the vinyl group with finely divided metallic potassium while said potassium is suspended in an inert liquid.

2. Process for making a vinylpotassium compound selected from the group consisting of vinylpotassium and hydrocarbon-substituted vinylpotassiums wherein the potassium atom is attached directly to a carbon atom in the vinyl group which comprises reacting the corresponding vinyl halide wherein the halogen atom is attached directly to a carbon atom in the vinyl group with a sodium-potassium alloy, containing between 40 and 90 weight percent potassium, while said alloy is dispersed in an inert liquid.

3. Process for making a vinylpotassium compound selected from the group consisting of vinylpotassium and hydrocarbon-substituted vinylpotassiums wherein the potassium atom is attached directly to a carbon atom in the vinyl group which comprises reacting the corresponding vinyl halide wherein the halogen atom is attached directly to a carbon atom in the vinyl group with metallic potassium in an inert liquid, said reaction being carried out at a temperature below 0° C.

4. Process for making a vinylpotassium compound selected from the group consisting of vinylpotassium and hydrocarbon-substituted vinylpotassiums wherein the potassium atom is attached directly to a carbon atom in the vinyl group which comprises reacting the corresponding vinyl halide wherein the halogen atom is attached directly to a carbon atom in the vinyl group with metallic potassium in an inert liquid, said reaction being carried out at a temperature of about minus 25° C.

5. Process for making a vinylpotassium compound selected from the group consisting of vinylpotassium and hydrocarbon-substituted vinylpotassiums wherein the potassium atom is attached directly to a carbon atom in the vinyl group which comprises reacting the corresponding vinyl halide wherein the halogen atom is attached directly to a carbon atom in the vinyl group with metallic potassium while said potassium is suspended in an ether containing between two and twelve carbon atoms.

6. Process for making vinylpotassium which comprises reacting a vinyl halide with metallic potassium in an inert liquid, said reaction being carried out at a temperature below 0° C.

7. Process for making cyclohexenylpotassium which comprises reacting a cyclohexenyl halide with metallic potassium in an inert liquid, said reaction being carried out at a temperature below 0° C.

8. Process for making alpha-styrylpotassium, which comprises reacting an alpha-styryl halide with metallic potassium in an inert liquid, said reaction being carried out at a temperature below 0° C.

9. Process for making 2-butenylpotassium which comprises reacting a 2-butenyl halide with metallic potassium in an inert liquid, said reaction being carried out at a temperature below 0° C.

10. Process for making alpha-methyl-beta-styryl-potassium which comprises reacting an alpha-methyl-beta-styryl halide with metallic potassium in an inert liquid, said reaction being carried out at a temperature below 0° C.

11. Process for making a vinylpotassium compound selected from the group consisting of vinylpotassium and hydrocarbon-substituted vinylpotassiums wherein the potassium atom is attached directly to a carbon atom in the vinyl group which comprises reacting the corresponding vinyl chloride wherein the halogen atom is attached directly to a carbon atom in the vinyl group with finely divided metallic potassium while said potassium is dispersed in an ether selected from the group consisting of ethyl ether, propyl ethers, butyl ethers, hexyl ethers, diethylene glycol diethyl ether, and ethylene glycol dibutyl ether, said reaction being carried out in an atmosphere which will not promote side reactions and at a temperature below 0° C.

References Cited in the file of this patent

UNITED STATES PATENTS

| | | |
|---|---|---|
| 2,012,372 | Bockmuhl | Aug. 27, 1935 |
| 2,454,082 | Morton | Nov. 16, 1948 |

OTHER REFERENCES

Coates: Organo-metallic Compounds (1956), John Wiley & Sons, New York, N.Y., pages 11 to 17.

Tickner et al.: J. Chem. Physics 19, pages 1247–49 (1951).